(12) United States Patent
Rauhala

(10) Patent No.: US 8,135,745 B2
(45) Date of Patent: Mar. 13, 2012

(54) STORAGE MANAGEMENT

(75) Inventor: Martti Juhani Rauhala, Lievestuore (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 314 days.

(21) Appl. No.: 12/041,798

(22) Filed: Mar. 4, 2008

(65) Prior Publication Data

US 2009/0228536 A1 Sep. 10, 2009

(51) Int. Cl.
*G06F 7/00* (2006.01)
*G06F 17/30* (2006.01)

(52) U.S. Cl. ............ 707/784; 707/813; 707/822

(58) Field of Classification Search .......... 707/705, 707/781, 783, 784, 785, 813, 821, 822, 827
See application file for complete search history.

(56) References Cited

U.S. PATENT DOCUMENTS

| | | | |
|---|---|---|---|
| 5,754,953 A | 5/1998 | Briancon et al. | |
| 5,867,781 A | 2/1999 | Hofmann | |
| 5,887,254 A | 3/1999 | Halonen | |
| 5,913,037 A | 6/1999 | Spofford et al. | |
| 5,974,509 A | 10/1999 | Berliner | |
| 6,006,034 A | 12/1999 | Heath et al. | |
| 6,023,620 A | 2/2000 | Hansson | |
| 6,026,366 A | 2/2000 | Grube | |
| 6,052,600 A | 4/2000 | Fette et al. | |
| 6,108,534 A | 8/2000 | Bourgeois et al. | |
| 6,122,523 A | 9/2000 | Zicker et al. | |
| 6,178,443 B1 | 1/2001 | Lin | |
| 6,226,739 B1 | 5/2001 | Eagle | |
| 6,256,711 B1 | 7/2001 | Berliner | |
| 6,381,741 B1 | 4/2002 | Shaw | |
| 6,393,496 B1 | 5/2002 | Schwaderer et al. | |
| 6,411,804 B1 | 6/2002 | Isomichi et al. | |
| 6,956,562 B1 | 10/2005 | O'Hara et al. | |
| 2002/0022973 A1* | 2/2002 | Sun et al. .................. | 705/3 |
| 2002/0132610 A1 | 9/2002 | Chaplin et al. | |
| 2004/0158829 A1 | 8/2004 | Beresin et al. | |
| 2004/0255289 A1* | 12/2004 | George et al. .............. | 717/174 |
| 2006/0046696 A1* | 3/2006 | Knowles et al. ............ | 455/412.1 |
| 2006/0183462 A1* | 8/2006 | Kolehmainen .............. | 455/411 |
| 2006/0200570 A1 | 9/2006 | Stirbu et al. | |
| 2006/0242273 A1* | 10/2006 | Fiducci ..................... | 709/220 |

(Continued)

FOREIGN PATENT DOCUMENTS

CA 2267549 9/2000

(Continued)

OTHER PUBLICATIONS

Khungar, et al., "A Context Based Storage System for Mobile Computing Applications", ACM SIGMOBILE Mobile Computing and Communications Review, Jan. 2005, vol. 9, No. 1, pp. 64-68.

(Continued)

*Primary Examiner* — Marc Somers
(74) *Attorney, Agent, or Firm* — AlbertDhand LLP

(57) ABSTRACT

A user may select a profile to serve as an active profile on a device, and content objects associated with the active profile may be stored on the device responsive to the selection. Content objects that are not associated with the active profile may be transferred to one or more additional devices based on a prioritization scheme. Content object download operations may take advantage of the prioritization scheme to determine a storage device for a downloaded content object.

20 Claims, 7 Drawing Sheets

U.S. PATENT DOCUMENTS

| | | | |
|---|---|---|---|
| 2007/0081787 A1* | 4/2007 | Hong et al. | 386/83 |
| 2007/0185899 A1* | 8/2007 | Ziv et al. | 707/102 |
| 2007/0240126 A1 | 10/2007 | Allen | |
| 2007/0254697 A1* | 11/2007 | Sugio et al. | 455/556.2 |
| 2008/0034008 A1* | 2/2008 | Burke et al. | 707/201 |

FOREIGN PATENT DOCUMENTS

| | | |
|---|---|---|
| EP | 0459344 | 12/1991 |
| EP | 0991290 | 4/2000 |
| EP | 1035741 | 9/2000 |
| JP | 11331911 | 11/1999 |
| WO | 9838820 | 9/1998 |
| WO | 0058838 | 10/2000 |
| WO | 0239231 | 5/2002 |

OTHER PUBLICATIONS

Hess, et al., "An Application of a Context-Aware File System", Personal and Ubiquitous Computing, Nov. 14, 2003, vol. 7, No. 6, pp. 339-352.

International Search Report and Written Opinion for PCT/FI2009/050150 dated Jun. 12, 2009.

Jamadagni, et al., "A PUSH Download Architecture for Software Defined Radios", International Conference on Personal Wireless Communications 2000 IEEE, Dec. 17-20, 2000, pp. 404-407, XP002902145.

* cited by examiner

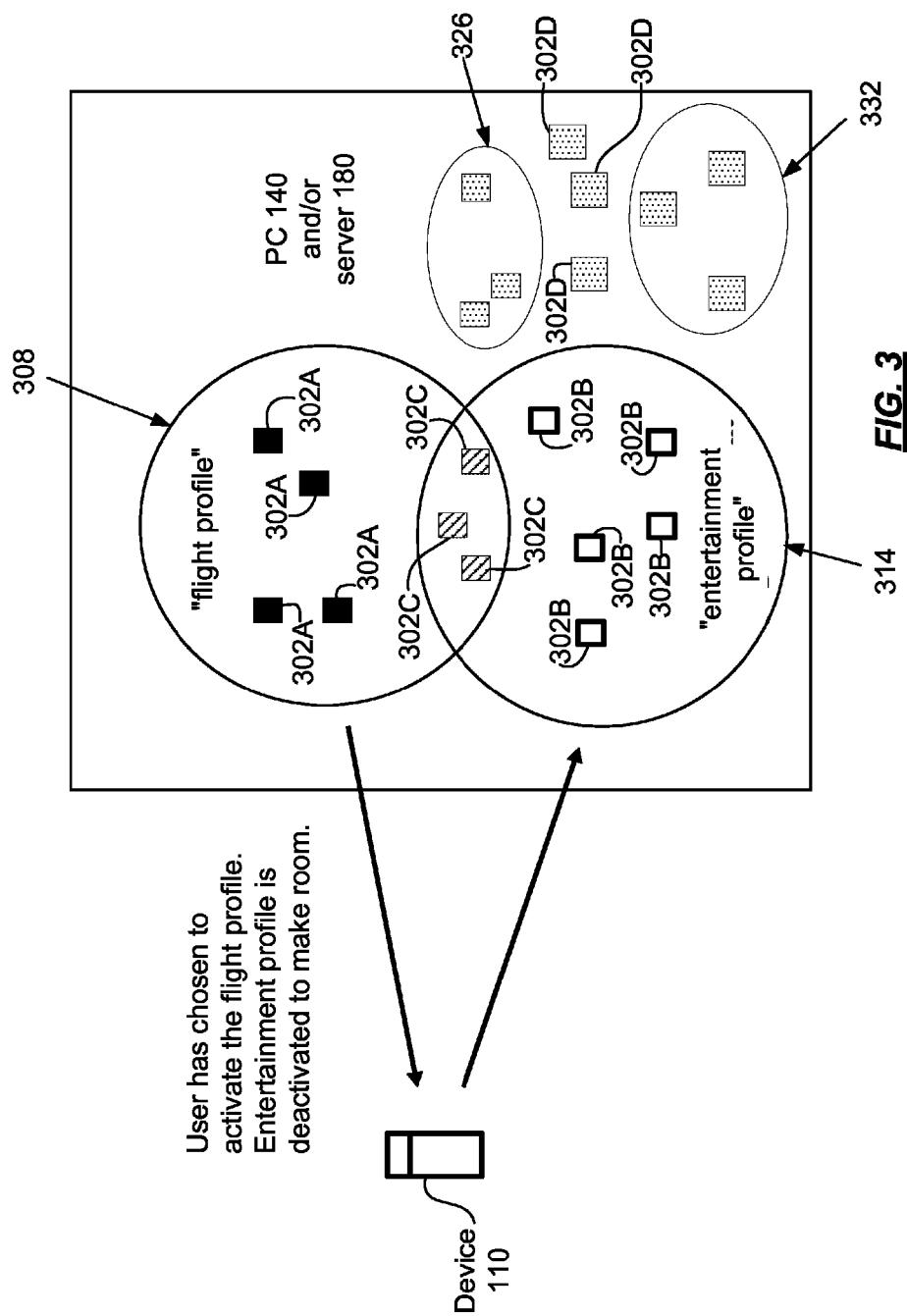

STORAGE MANAGEMENT

FIELD

This description generally relates to storage of data on electronic devices and management of resources utilized for such storage.

BACKGROUND

Improvements in technology have changed the way people interact with their surrounding environment. These improvements provide opportunities and abilities for users of wireless technology to obtain numerous types of application programs, data files, etc., in almost any location. Today, there is a large amount of content available for downloading from the Internet, and a large number of applications supporting various file types. For example, a user may download a music video clip to her mobile handheld device while at a neighborhood park on Saturday, and may proceed to play it on her device for purposes of entertaining herself and those around her. The same user may be at an airport on Monday morning to take a business trip and wish access to business reports for purposes of giving a presentation. Accordingly, the user receives an email on the same mobile handheld device from a co-worker that includes the desired business reports as an attachment.

Improvements in memory density (e.g., the amount of memory capacity provided per unit area) have enabled users to store an increasing amount of data on devices so as to accommodate these and innumerable other scenarios. Memory capacity is still finite, however, and there are practical limits as to how much data may be stored on a given device at any particular moment. These limits are particularly pronounced in the context of mobile devices, as recent trends suggest that smaller devices are desirable.

By way of illustration, and returning to the previous example, the emailed business reports may require more storage space than is currently free in the mobile device's memory(ies). Although the user may be able to delete one or more currently-stored items to make room for the business reports, this is often undesirable. For example, the user may have recently taken a number of high resolution pictures of the birth of her friend's baby and not wish to lose those images.

BRIEF SUMMARY

The following presents a simplified summary of aspects of certain embodiments. This summary is not an extensive overview, and is not intended to identify key or critical elements or to delineate the scope of the claims.

In some embodiments sets of content objects are associated with content management profiles for a device. When a user activates a content management profile, the content objects in the set of content objects associated with that profile are (to the extent not already present on the device) stored in the device memory. In certain embodiments, storage space in the device for content objects of the activated profile is made available by deactivating a second profile. Content objects in the deactivated profile that are not also in the set of objects associated with the activated profile are removed from the device by deletion or by transferral for storage in another device.

Additional embodiments permit a first device to determine where one or more content objects should be stored. Upon receiving an instruction that corresponds to a requirement for storage capacity, one or more devices in a prioritized group are evaluated for an ability to store the one or more content objects. The content object(s) are then stored on the highest priority device able to store those objects. The prioritized group may or may not include the first device. In some cases, for example, the one or more content objects are being retrieved from a remote source and there is a desire to store those objects on the first device. In such a circumstance, the first device is part of the prioritized group of devices and has the highest priority. In other cases, the one or more content objects are already stored on the first device and there is a desire to remove those content objects from the first device in order to store new content objects. In these circumstances, the first device is not part of the prioritized group.

BRIEF DESCRIPTION OF THE DRAWINGS

The foregoing summary and the following detailed description are better understood when read in conjunction with the accompanying drawings, which are included by way of example, and not by way of limitation. In the drawings, like reference numbers indicate like features.

FIG. 3 is a diagram illustrating the use of content management profiles according to some embodiments.

DETAILED DESCRIPTION

In the following description of the various embodiments, reference is made to the accompanying drawings, which form a part hereof, and in which is shown by way of illustration various embodiments in which one or more aspects of the invention may be practiced. It is to be understood that other embodiments may be utilized and structural and functional modifications may be made.

As used herein, "content object" generically refers to any of various types of data. A content object may be, without limitation, one or more of a data object or file (e.g., an image file, a video file, a text file, a spreadsheet, an audio file, a file having one or more slides or other types of presentation(s), etc.) an application program or component thereof, an operating system program or component thereof, a driver, etc.

Figure 1:
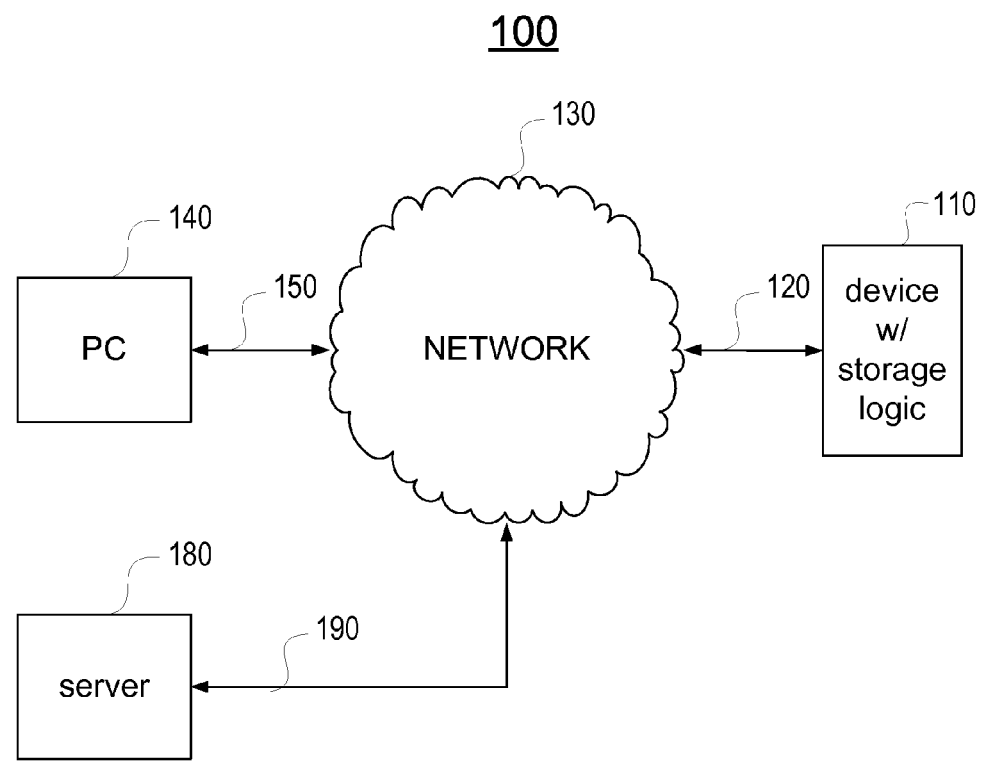
FIG. 1 illustrates a network communication environment in which one or more devices are operated and/or one or more methods performed according to some embodiments.

FIG. 1 is a diagram of a network communication environment 100 in which one or more devices according to some embodiments are operated, and in which one or more methods according to some embodiments are performed. A first device 110 includes logic for managing profiles and for determining an appropriate storage location for content objects and is connected to a network 130 via a connection 120. Network 130 may include the Internet, an intranet, wired or wireless networks, or any other network suitable for facilitating communication between devices in general. Network 130 may also be a group of interconnected networks. For example, device 110 may communicate with a wireless mobile network, which in turn communicates via the Internet with one or more devices on a remotely-located LAN (local area network) or wireless LAN (WLAN) in a home or office. Also shown in FIG. 1 is a second device 140 connected to network 130 via a connection 150. In the embodiment of FIG. 1, device 140 is a personal computer. Further shown in FIG. 1 is a third device 180. In the embodiment of FIG. 1, device 180 is a file server (or collection of file servers). Device 180 is in a different location from device 140, although this need not be the case. Device 180 communicates with network 130 via a connection 190. By virtue of the connectivity shown, devices 110, 140, and 180 communicate with one another. Such communications enable the exchange of various types of information as described herein.

The actual connections represented by connections 120, 150, and 190 may be embodied in various forms. For example, one or more of connections 120, 150, and 190 may be hardwired/wireline connections. Alternatively, one or more of connections 120, 150, and 190 may be wireless connections. Connections 120, 150, and 190 are shown in FIG. 1 as supporting bi-directional communications (via the dual arrow heads on each of connections 120, 150, and 190). Alternatively, or additionally, network communication environment 100 may be structured to support dissimilar forward and reverse channel connections between various network entities (e.g., use of one media for communication in one direction and use of a different media for communication in a different direction).

Communication environment 100 may be part of a larger network consisting of additional devices. For example, devices 140 and/or 180 may exchange communications with a plurality of other devices (not shown) in addition to device 110, and/or device 110 may exchange communications with devices in addition to PC 140 and/or server 180. Communications in environment 100 may be conducted using one or more of numerous communication protocols. Furthermore, communication environment 100 may include one or more intermediary nodes (not shown) that may forward, buffer, store, route, or otherwise process communications between the various devices.

Figure 2:
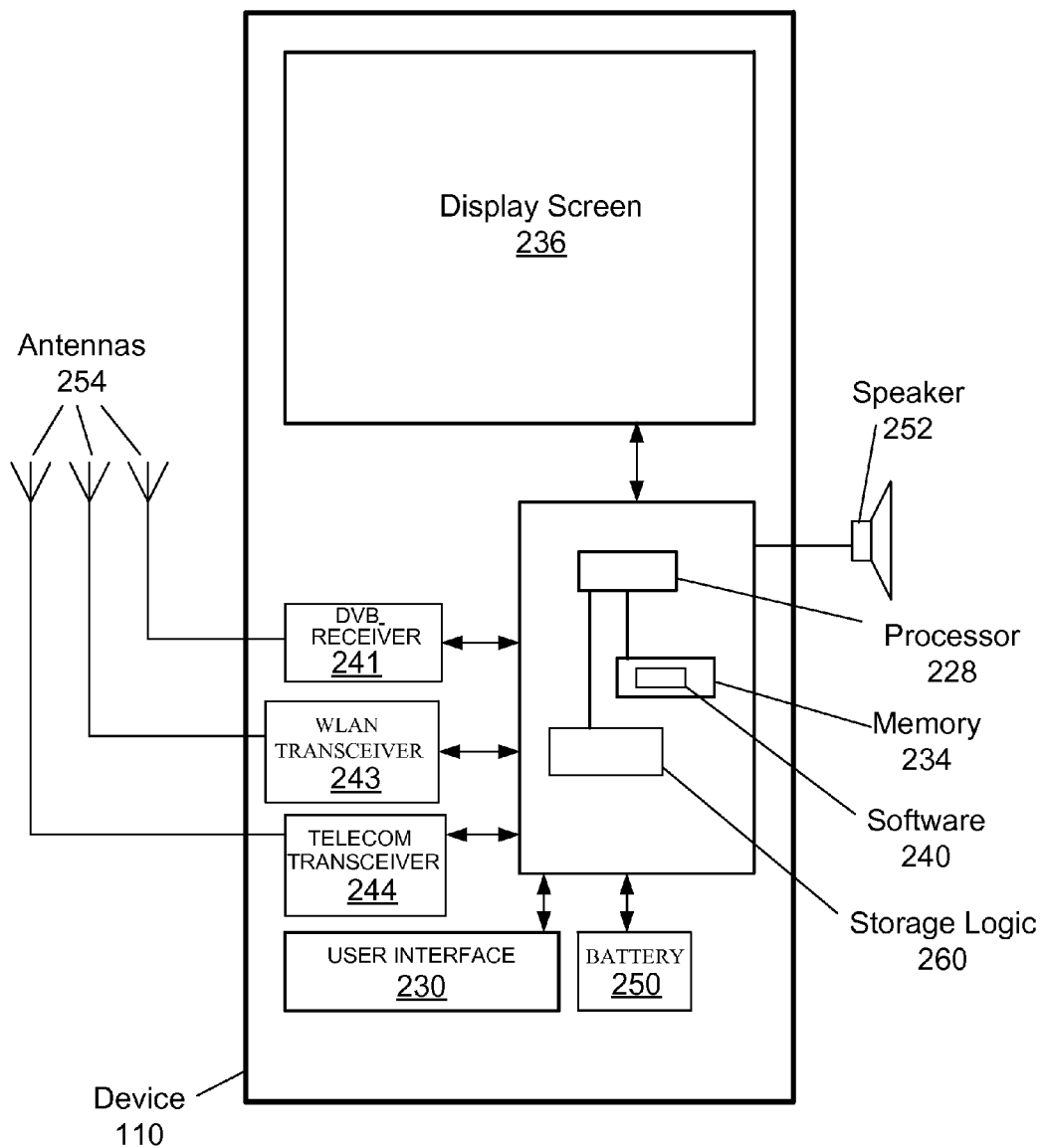
FIG. 2 is a block diagram of a mobile handheld device according to some embodiments.

FIG. 2 is a block diagram of device 110 according to some embodiments. Device 110 could be any of various types of portable electronic devices (e.g., a laptop computer, a notebook computer, some other type of portable computing device, a personal digital assistant, a smart phone, a mobile telephone, some other type of wireless communication device, etc.). All of the components shown in FIG. 2 need not be present in all embodiments. Although various components of device 110 are represented as a single block, device 110 may include more than one of a particular component represented by a given block in FIG. 2. As shown in FIG. 2, device 110 includes a processor 228 connected to a user interface 230, a memory 234 and/or other storage, and a display screen 236. User interface 230 may further include a keypad, touch screen, voice interface, four arrow keys, joy-stick, stylus, data glove, mouse, roller ball, touch screen, or the like. Device 110 also includes a battery 250, a speaker 252, and one or more antennas 254.

Also included within device 110, as part of one or more programs executed by processor 228, is storage logic 260. Although shown as a separate component in FIG. 2, storage logic 260 may be included in memory 234 with one or more other programs accessed by processor 228. In some embodiments, storage logic 260 configures processor 228 to create, execute and otherwise process data in accordance with one or more content management profiles. The operation of content management profiles according to some embodiments is described below. Storage logic 260 further configures processor 228 to determine locations for storage of content objects in memory of device 110, in device 140, in device 180, or elsewhere. The determination of storage locations is also discussed below. In alternate embodiments, storage logic 260 may configure processor 228 to perform less than all of these operations. In still other embodiments, all or part of storage logic 260 may be located in device 140, device 180, or in some other location.

As indicated above, executable instructions and data used by processor 228 and other components within device 110 are (in some embodiments) stored in a machine-readable memory 234. Memory 234 may be implemented with any combination of read only memory modules or random access memory modules, optionally including both volatile and non-volatile memory. Software 240 (which may include some or all of the elements of storage logic 260) may be stored within memory 234 (and/or other storage within device 110) to provide instructions to processor 228 for enabling device 110 to perform various functions described herein. Alternatively, some or all of the instructions executed by processor 228 may be embodied in hardware or firmware (not shown). For example, the executable instructions may be embodied in one or more integrated circuits such as application-specific integrated circuits (ASICs), field programmable gate arrays (FPGAs), or the like. One of skill in the art will appreciate that integrated circuits may include logic circuits, and that the logic circuits may be configured using one or more programmable files, fuse maps, or the like.

Device 110 may also include additional hardware, software and/or firmware. For example, device 110 may be configured to receive, decode and process digital broadband broadcast transmissions that are based, for example, on the Digital Video Broadcast (DVB) standard, such as DVB-H, DVB-T or DVB-MHP, through a specific DVB receiver 241. Device 110 may also be provided with other types of receivers for digital broadband broadcast transmissions or for other types of broadcasts (e.g., AM/FM radio). Additionally, device 110 is configured to transmit, receive, encode, decode and process transmissions through one or more of WLAN transceiver 243, telecommunications transceiver 244, or other type of wireless communication interface. Device 110, in at least some embodiments, may also include one or more short-range wired interfaces (e.g., USB) or wireless interfaces (e.g., BLUETOOTH). Additional formats and protocols may be used to convey information, data, messages and the like.

Some embodiments include a machine-readable media holding instructions that, when executed (e.g., by one or more processors within device 110), cause device 110 and/or other elements in environment 100 to perform various operations as described herein. For example, product implementations may include a series of machine-readable instructions fixed on a tangible storage medium (e.g. a diskette, CD-ROM, ROM, DVD, fixed disk, thumb drive, etc.) or transmittable to device 110 (e.g., via a modem or other interface). The machine-readable instructions may embody all or part of the functionality with respect to a system (e.g., network communication environment 100 of FIG. 1) or device (e.g., device 110, device 140 and/or device 180), and can be written in any of various programming languages for use with many different computer architectures and/or operating systems, as would be readily appreciated by one of ordinary skill. Various embodiments of the invention may also be implemented as hardware, firmware or a combination of software, hardware and/or firmware.

FIG. 3 is a diagram that illustrates the use of content management profiles according to some embodiments. More specifically, FIG. 3 illustrates the use of content management profiles to manage one or more sets of user-defined content objects according to some embodiments. In the example of FIG. 3, and building on a previous example, a user of device 110 is preparing to board an aircraft for purposes of taking a business trip. During the trip the user will want to access a collection of content objects, shown in FIG. 3 as solid squares 302A, as well as a collection of objects shown in FIG. 3 as cross-hatched squares 302C. Those objects may be, e.g., text files, spreadsheets, images, slides, etc. needed to prepare for a meeting. Accordingly, the user inputs commands into device 110 that causes processor 228 to execute instructions to activate a first profile. That first profile ("flight profile" 308) is associated with the set of content objects the user wishes to access in order to prepare for her meeting. In order to create storage space on device 110 for the content objects in flight profile 308, a second profile ("entertainment profile" 314) is deactivated. This deactivation may result from a separate user instruction or may occur automatically in response to activation of flight profile 308. When entertainment profile 314 is deactivated, content objects associated with profile 314 and which are not associated with profile 308 (shown as white boxes 302B in FIG. 3) are deleted and/or transferred.

As used herein, "deleting" a content object from device 110 refers to re-allocation of memory used to store the deleted object for storage of other data. The re-allocated memory may be immediately reused to store other content objects or other data, may be securely erased (e.g., by overwriting with random ones (1s) and zeros (0s)), or simply flagged as available to store other data. "Transferring" a content object refers to re-allocation of the memory used to store the transferred object in conjunction with causing the transferred object to be stored elsewhere (e.g., PC 140, server 180, etc.). "Removing" a content object refers to either deleting or transferring that object.

A user may create a profile in any of various ways. In some cases, a user associates content objects with a profile using device 110. In response to received user instructions defining content objects as part of a set of objects to be associated with a profile, device 110 tags those content objects as associated with that profile. In other cases, a user may create a profile (and define content objects associated with that profile) using a PC (e.g., PC 140) or other device, and then make that profile (and its associated content objects) available to device 110. In the example of FIG. 3, some content objects (shown as cross-hatched boxes) are included within both profile 308 and profile 314, though this need not be the case. Although only two profiles are shown in FIG. 3, any number of profiles can be created.

When a user first creates a content object, the user is in some embodiments requested to define which profile(s) (if any) the content object should be associated with. In some embodiments, a newly-created content object is provided with a default tag that automatically serves to associate the newly-created object with one or more default profiles.

Associating content objects with profiles allows the user to load all content objects associated with a given profile by simply specifying the profile. In this manner, a user is not required to remember or search for individual content objects at times when it may be inconvenient to do so. Instead, a user simply instructs device 110 (via an appropriate command) that a particular profile should be made active. In response, processor 228 loads the content objects associated with that activated profile (to the extent any such objects are not already stored on device 110). Those objects may be loaded from PC 140, from server 180, or from some other location. If necessary, processor 228 can also make room for content objects associated with the activated profile by deleting objects in a profile being deactivated and/or by transferring one or more of those objects to PC 140, sever 180 or to some other location.

In some embodiments, one or more data files storing the association (e.g., a mapping) between content objects and profiles may be stored at device 110 (e.g., in memory 234 of FIG. 2). In other embodiments, the association data files may also (or alternatively) be stored at another device (e.g., PC 140, server 180, etc.).

To the extent a content object in an activated profile is also part of a profile being deactivated, no action is needed. Thus, if the user of device 110 in the example of FIG. 3 is deactivating entertainment profile 314 and activating flight profile 308, the content objects common to both of those profiles (i.e., the cross-hatched boxes 302C in FIG. 3) are already in place and need not be loaded. Although the present example assumes only one profile is active, this need not be the case, and a user may activate more than one profile.

Alternatively, or additionally, one or more of the content objects associated with an active profile might not be physically stored on device 110 as a result of profile activation. Instead, some content objects may be referenced by a link located on device 110. Linking may be used in some embodiments to preserve memory capacity on device 110, particularly when a content object requires a large amount of memory capacity relative to a storage capacity required by a link and/or where interruption of network connectivity is not expected.

In some embodiments, and as shown in FIG. 3, the profiles (e.g., flight profile 308, entertainment profile 314, and other profiles 326 and 332) and content objects 302 are stored on PC 140, server 180, and/or other devices. Such devices will often (though not necessarily) have a higher storage capacity than device 110. Some content objects (e.g., content object 302D) might not be associated with any profile.

When the user deactivates a profile in some embodiments (e.g., deactivating profile 314 in favor of flight profile 308), and as discussed above, content objects (e.g., content objects 302B) not belonging to an active profile are removed from device 110 (e.g., deleted or transferred to another device). In other embodiments, it is desirable to limit the number of content object transactions that occur when activating one profile and deactivating another profile. For example, in order to conserve (battery) power on device 110 or to conserve communication network bandwidth, it may be desirable to limit the number of content objects added to or removed from device 110. Additional considerations may dictate minimizing the number of content object transactions in order to conserve processing resources on device 110. For example, device 110 may be running a resource intensive application that requires a majority of the processing resources available on device 110. In the example of FIG. 3, content objects in flight profile 308 require a total of 3.5 GB of storage memory and device 110 has 0.5 GB of available storage capacity not being used by entertainment profile 314 or by other data. If the additional content objects added to device 110 as a result of activating profile 308 (e.g., the blackened objects in FIG. 3) do not exceed 0.5 GB, then removal of content objects will not take place in some embodiments. Conversely, if the content objects being added to device 110 require more than 0.5 GB, at least one content object not in an active profile may require removal.

In some embodiments, device 110 is configured to remove a minimum number of content objects necessary to create sufficient storage capacity to facilitate adding the content objects associated with activated profile 308. The selection of which content objects to delete from device 110 may be based on various criteria. The selection may be based on a storage capacity required by inactive profile content objects. For example, device 110 may be configured to delete the largest content objects (in terms of memory capacity required to support their storage) first in order to minimize the number of content objects that need to be deleted. The selection of which content objects to delete could also (or alternatively) be based on frequency of use. For example, those content objects that have not been accessed for a relatively long amount of time may be deleted in order to allocate storage capacity on device 110 for content objects associated with a profile being activated. Other criteria may be used to determine which content object(s) to remove from device 110 in order to allocate sufficient storage capacity for flight profile 308.

In some embodiments, the user receives a warning or indication message on device 110 requesting the user to confirm that it is acceptable for a content object (or group of content objects) to be deleted. The user may thereafter press a key or button on device 110, provide a verbal command (e.g., in conjunction with speech recognition techniques or the like) or allow a timer on device 110 to expire to confirm the deletion. In some embodiments, device 110 provides the user with a listing of content objects that it recommends as the best candidates for deletion, and the user may be able to select from the recommended candidates.

In some embodiments, processor 228 of device 110 executes one or more algorithms to decide where content objects should be transferred when attempting to create storage space in device 110. These algorithms can be performed in connection with activating/deactivating one or more profiles, and/or in connection with content that is not associated with a profile. For example, server 180 may be subject to excessive loading at times due to a relatively large number of users attempting to simultaneously access server 180. Accordingly, device 110 in some embodiments attempts to first transfer content objects to PC 140. If an attempt to transfer objects to PC 140 is unsuccessful (e.g., if PC 140 is not available because it is offline) device 110 next attempts to transfer content objects to server 180.

Figure 4A:
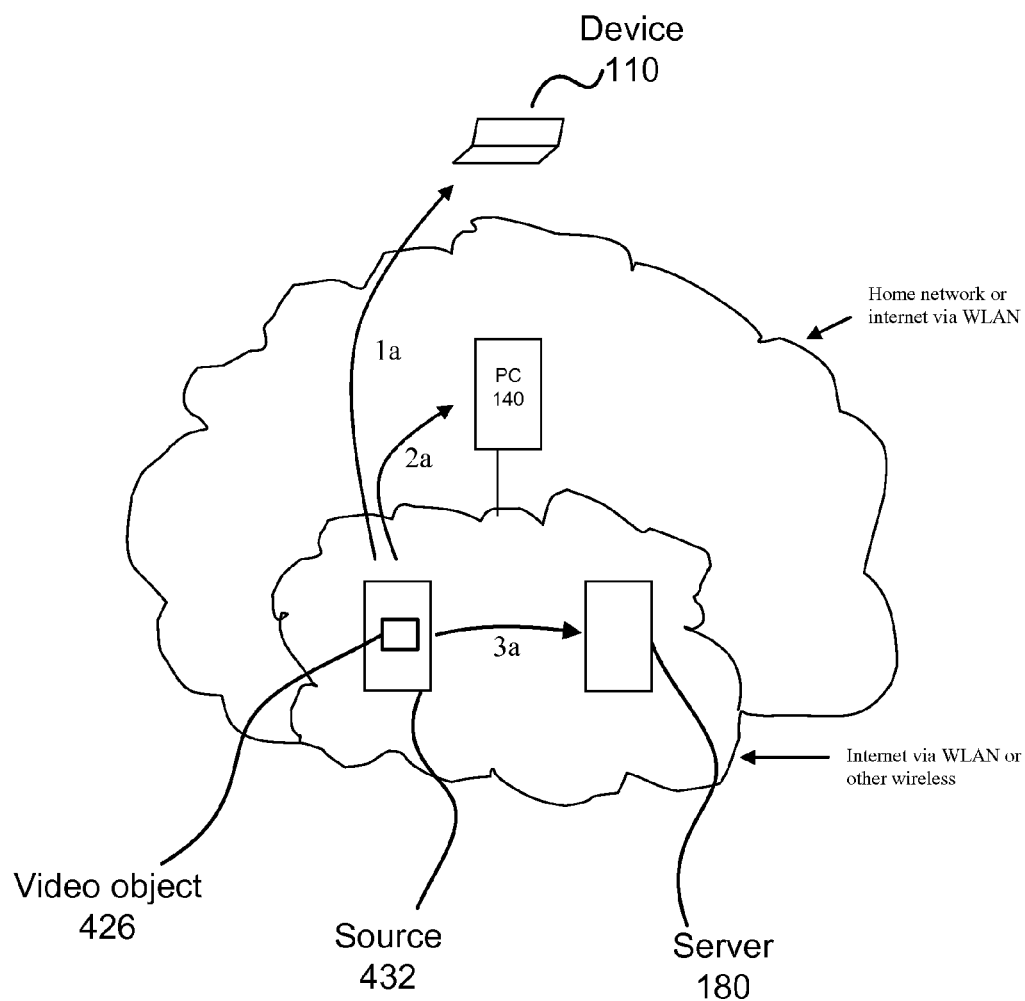
FIG. 4A is a diagram illustrating storage of content objects according to some embodiments.
Figure 4B:
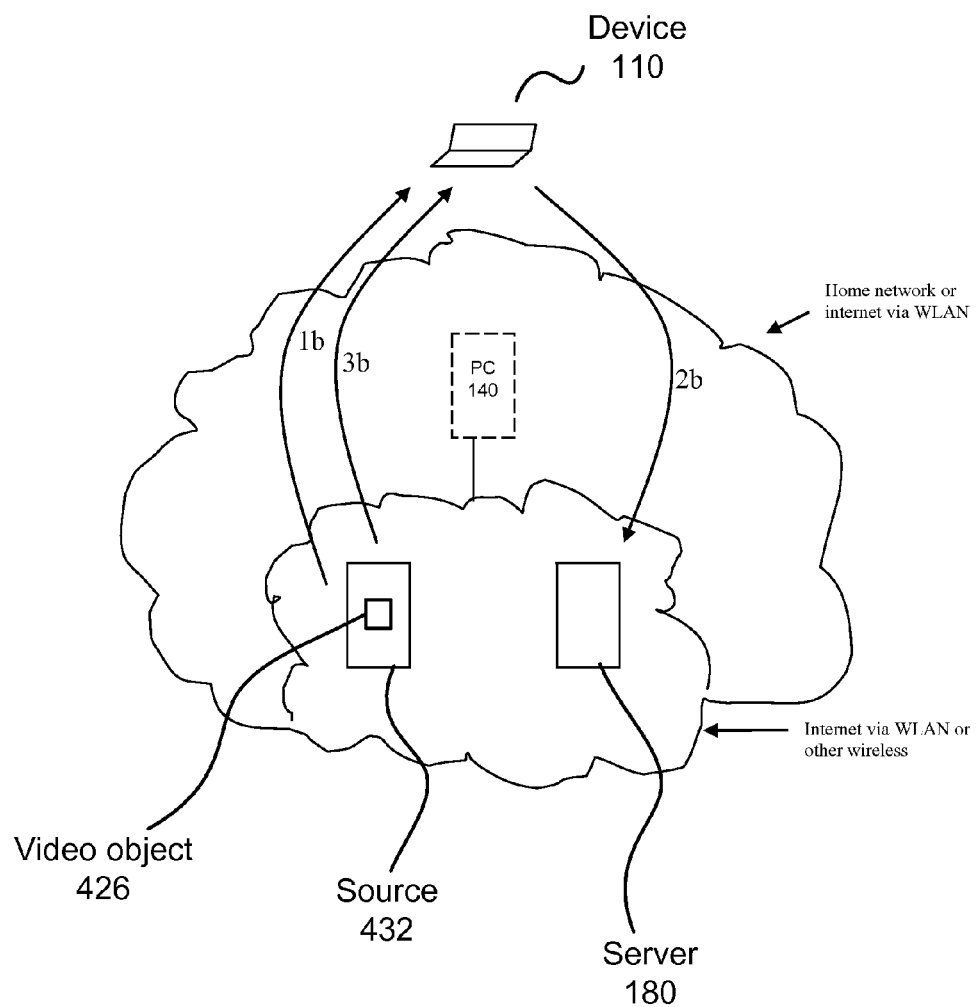
FIG. 4B is another diagram illustrating storage of content objects according to some embodiments.

In some embodiments, the capacity available at each of multiple storage locations is analyzed to determine the most appropriate location for content object storage. FIG. 4A is a diagram showing storage of content objects according to at least one such embodiment. In the example of FIG. 4A, a user of device 110 initiates a content object download operation to retrieve a music video content object 426 from a source 432. In the example of FIGS. 4A and 4B, device 110 is part of a wireless communication network; that wireless network is in communication with source 432 and server 180 via the Internet, and in communication with PC 140 via the Internet and a home network in which PC 140 is located. Embodiments of the invention include implementations in one or more other types of networks. For example, device 110 may be part of a wireless local area network (WLAN), with that WLAN connected to the Internet. PC 140 could be on that same WLAN.

As shown in FIG. 4A by arrow 1*a*, device 110 first receives data from source 432 indicating storage space needed for video object 426. Device 110 compares the size of video object 426 with the available storage capacity at device 110 to determine if device 110 has sufficient storage capacity to support video object 426. In the example of FIG. 4A, the memory of device 110 is full (or nearly full). Accordingly, device 110 determines if PC 140 has sufficient memory capacity to store video object 426. If PC 140 does have sufficient storage capacity, and as shown with arrow 2*a*, video object 426 is saved in storage of PC 140. If PC 140 does not have sufficient storage capacity (or is offline), device 110 then determines if server 180 is capable of storing video object 426. If so, device 110 causes video object 426 to be stored at server 180 (arrow 3*a*). If server 180 cannot store video object 426 or is offline, other storage locations (not shown) could be checked, the download of video object 426 aborted (or suspended), or storage capacity made available in device 110 by deleting or transferring other content objects.

As can be appreciated from FIG. 4A and the foregoing, several storage locations are prioritized. A highest priority is given to device 110, a lower priority is given to PC 140, and a still lower priority is assigned to server 180. The prioritization scheme of FIG. 4A is only one example, however, and other priority schemes can be used. Priority schemes can be based on bandwidth considerations, security concerns, and/or various other factors.

In some embodiments, a user is able to dictate the priorities associated with devices via one or more directives. The one or more directives may include commands, instructions, or the like. For example, a user downloading a personal banking statement may have previously directed that all downloads from a particular source (e.g., the user's bank) go either to device 110 or to PC 140, with a higher priority assigned to device 110 in comparison to the priority assigned to PC 140. Thereafter, the user may, via one or more directives, assign a higher priority to PC 140 (in comparison to device 110) so as to cause one or more content objects to be stored in PC 140 in preference to device 110.

In some embodiments, a prioritization scheme is operative with respect to all content objects. For example, a prioritization scheme may serve to prioritize storage in one device (e.g., device 110) in comparison to another (e.g., PC 140), and as a result, a downloaded content object may be preferentially routed to the highest priority device (e.g., device 110) for storage irrespective of the nature of the content object. Alternatively, in some embodiments the prioritization scheme may be related to the nature of the content object. For example, a user may be able to specify via a prioritization scheme that content objects related to entertainment should preferably be routed to device 110 (instead of PC 140), whereas content objects related to business reports should preferably be routed to PC 140 (instead of device 110).

In some embodiments, a user may also be able to change devices in a prioritized group by directing that one or more devices be added to or removed from the group. For example, and building on the preceding example, a user may initially include device 110 and PC 140 in a prioritized group for purposes of storing a downloaded personal banking statement. The user may subsequently decide that she wants to use the storage capacity available on device 110 (only) for content objects related to entertainment. Accordingly, the user may remove device 110 from the prioritized group. The user may also add one or more devices (e.g., server 180) to the prioritized group.

FIG. 4B is a diagram illustrating another example of storage of content objects according to some embodiments. In the example of FIG. 4B, video object 426 from a source 432 is again to be downloaded via the Internet and other networks. As shown in FIG. 4B by arrow 1*b*, device 110 first receives data from source 432 indicating storage space needed for video object 426. Device 110 compares the size of video object 426 with the available storage capacity at device 110 to determine if device 110 has sufficient storage capacity to store video object 426. In the example of FIG. 4B, the memory of device 110 is full (or nearly full). Accordingly, device 110 determines if PC 140 is online and has sufficient storage capacity to accommodate one or more content objects presently stored in memory of device 110. If PC 140 does have sufficient storage capacity (and is online), device 110 may transfer those content objects to PC 140 by transmitting them to PC 140. After transmitting the one or more content objects to PC 140, device 110 may thereafter store video object 426 in its memory. If PC 140 does not have sufficient storage capacity to store one or more content objects (or is unavailable), device 110 determines if server 180 has sufficient storage capacity to store one or more content objects currently stored in memory of device 110. If server 180 does have sufficient storage capacity, device 110 transmits the one or more content objects stored in memory of device 110 to server 180. After transmitting the one or more content objects to server 180, device 110 may thereafter store video object 426 in its memory. In some embodiments, one or more of the content objects being removed from device 110 (in order to accommodate new content object(s)) may be local copies of content objects also stored on PC 140 or server 180. In such a circumstance, it would not be necessary to transmit that content object to PC 140, or server 180, and the locally stored copy could simply be deleted.

As can be appreciated from FIG. 4B and the foregoing, several storage locations are again prioritized. A first priority is given to PC 140 and a lower priority is assigned to server 180. A content object (e.g., video object 426) is "forced" into being stored in device 110. If device 110 is full, one or more content objects already stored on device 110 are removed by deletion or transfer to another device (e.g., PC 140, server 180, etc.) based on relative priorities. As with operations shown in FIG. 4A, the user of device 110 may (in connection with operations shown in FIG. 4B) change devices in a prioritized group and/or modify priorities assigned to devices.

One of skill in the art will appreciate that additional levels of storage may be employed in either the scenario of FIG. 4A or in the scenario of FIG. 4B (e.g., a user may have access to PCs on multiple LANs). Moreover, one of skill in the art will appreciate that at least some of the embodiments described herein enable one to access and save a content object that is only available for a limited duration. For example, a content object may be a coupon offer that is going to be removed from a commercial server within an hour of viewing it. If a user is two hours away from her home, she might not be able to take advantage of the offer using more traditional methods. Embodiments described herein allow the user to save the coupon offer on her device 110, PC 140 or server 180 for later access.

In some embodiments, device 110 is configured to display information (e.g., on display screen 236 of FIG. 2) related to a download progress associated with a download of a content object (e.g., a content object 302 of FIG. 3, video object 426 of FIGS. 4A-B, etc.). The display information may be depicted as a bar graph, a pie chart or the like. Alternatively, or additionally, in some embodiments device 110 provides an indication as to what step (e.g., what arrow number in accordance with the arrows/arrow numbers shown in FIGS. 4A-B) of the download process is being executed at a given point in time. Device 110 may provide an option for canceling the download. Alternatively, or additionally, device 110 may implement a timer such that when the timer expires or reaches a threshold value the download operation is canceled.

Figure 5A:
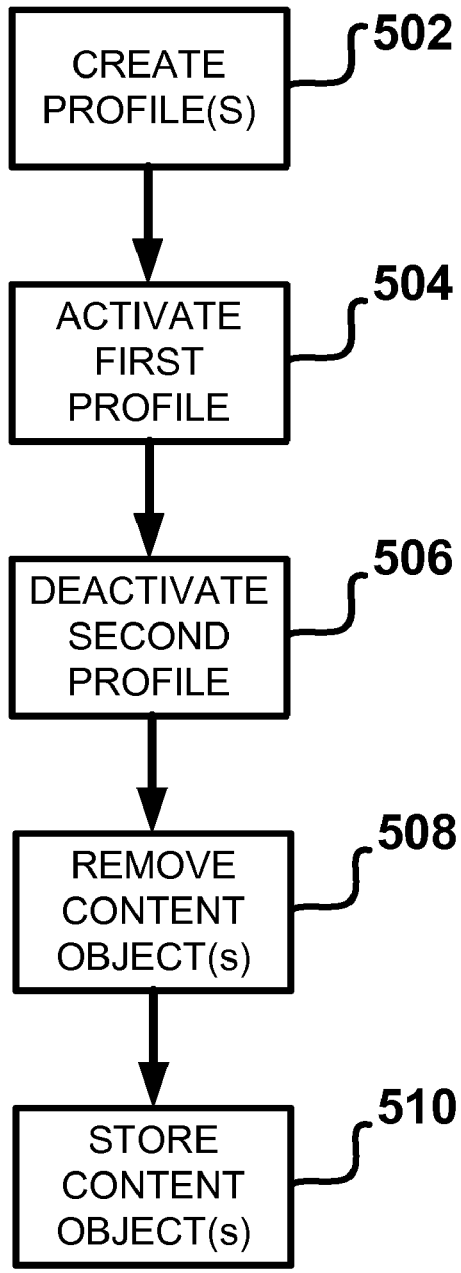
FIG. 5A is a flow chart showing an algorithm according to at least some embodiments.

FIG. 5A illustrates an algorithm 500a according to at least some embodiments. In the first step of algorithm 500a (block 502), a user creates one or more profiles for device 110. As explained above, the user may create such profiles using device 110 or using some other device (e.g., PC 140). In the next step of algorithm 500a (block 504), the user activates one of the previously-created profiles. In some embodiments, a user activates a profile using an explicit command input to device 110. In other embodiments, a profile may be automatically activated based on some other event. For example, mobile device 110 may detect that it has joined a WLAN corresponding to the user's home and automatically activate a profile the user has selected for use of device 110 when at home. In the next step (block 506), a second profile is deactivated in conjunction with activation of the first profile. In block 508, one or more content objects associated with the second profile are removed from device 110 in order to make room for content objects associated with the first profile. In block 510, content objects associated with the first profile are (to the extent not already present) stored on device 110.

Figure 5B:
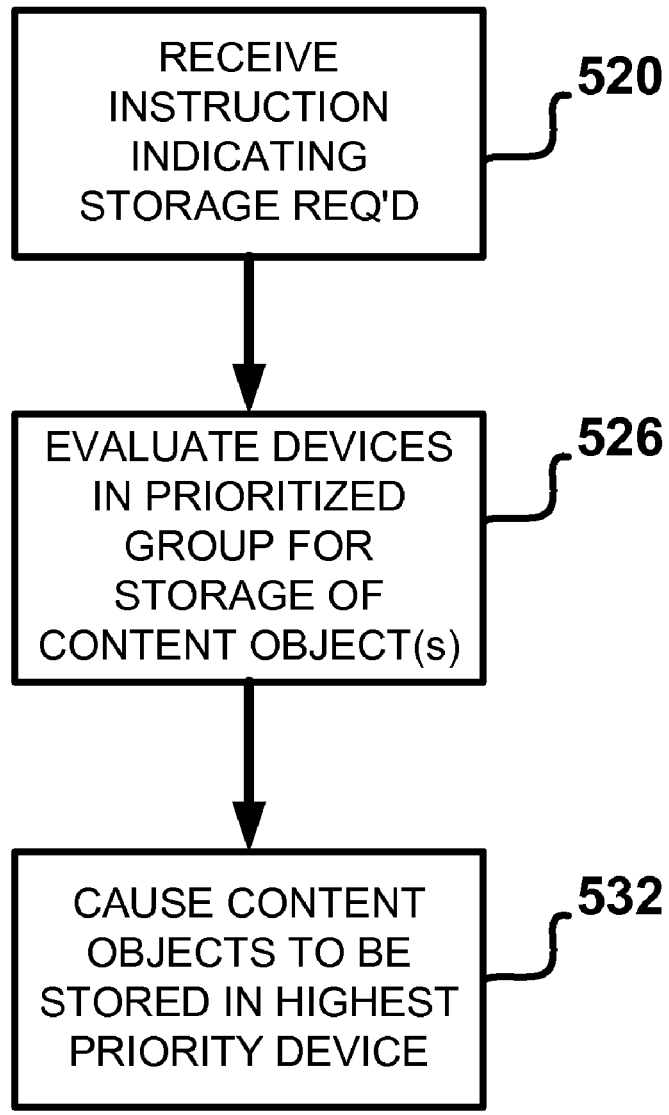
FIG. 5B is another flow chart showing an algorithm according to at least some embodiments.

FIG. 5B illustrates an algorithm 500b according to at least some embodiments. In the first step (block 520), an instruction is received at device 110 that indicates storage capacity will be required. In at least some embodiments, this instruction corresponds to a request by the user to download content to device 110 from a remotely-located source (e.g., source 432 shown in FIGS. 4A and 4B), and the required storage capacity will be at least the amount of storage needed for the content to be downloaded. In the next step (block 526), one or more devices in a prioritized group of devices are evaluated to determine if one of the evaluated devices has storage capacity that equals or exceeds that storage needed for the content to be downloaded. In some cases, and as explained in connection with FIG. 4A, storage on some device other than device 110 will be permitted if there is insufficient storage available capacity on device 110. In such a scenario, device 110 is part of the group of prioritized devices that are evaluated. In other cases, and as explained in connection with FIG. 4B, the downloaded content will be stored on device 110 even if device 110 does not currently have sufficient available storage capacity. In this scenario, one or more content objects may be transferred from device 110 in order to create storage capacity for the content to be downloaded. Accordingly, the group of prioritized devices includes the devices (other than device 110) to which the one or more content objects may be transferred. In the next step (block 532), device 110 causes one or more content objects to be stored on the highest-priority device that was determined (in the evaluation of block 526) to be able to store those objects. In the scenario of FIG. 4A, the one or more objects being stored in block 532 are the content that is being downloaded from remote source 432. In the scenario of FIG. 4B, the one or more objects being stored in block 532 are the objects being transferred from device 110 to make room for the content being downloaded from remote source 432.

In some embodiments, device 110 is configured to perform both the algorithm 500a of FIG. 5A and the algorithm 500b of FIG. 5B. In other embodiments, a device such as device 110 is only configured to perform one of algorithms 500a or 500b. In still other embodiments, algorithms 500a and 500b are combined into a single algorithm. In yet other embodiments, various steps in algorithms 500a and/or 500b are omitted and/or rearranged.

Numerous characteristics, advantages and embodiments have been described above with reference to the accompanying drawings. However, the above description and drawings are illustrative only. The invention is not limited to the illustrated embodiments, and all embodiments of the invention need not necessarily achieve all of the advantages or purposes, or possess all characteristics, identified herein. Various changes and modifications may be effected by one skilled in the art without departing from the scope or spirit of the invention. Although example devices and components have been described, the invention is not limited to such devices or components unless specifically required by the language of a claim. The elements and uses of the above-described embodiments can be rearranged and combined in manners other than specifically described above, with any and all permutations within the scope of the invention.

What is claimed is:

1. A method comprising:
   receiving an instruction to activate a first of a plurality of profiles for a mobile device, wherein each profile of the plurality is associated with a distinct set of user-defined content objects;
   activating the first profile in response to the received instruction, wherein said activation includes storing on the mobile device a first set of content objects associated with the first profile; and
   deactivating a second of the plurality of profiles in response to the received instruction, said deactivating including selecting a content object of a second set of content objects associated with the second profile and removing the content object of the second set from the mobile device based at least in part on a size and a frequency of use of the content object of the second set.

2. The method of claim 1, wherein associations between the first profile and content objects in the first set and associations between the second of the plurality of profiles and content objects in the second set are stored at the mobile device.

3. The method of claim 1, wherein associations between the first profile and content objects in the first set and associations between the second of the plurality of profiles and content objects in the second set are stored on a second device.

4. The method of claim 1, wherein the content objects include at least one object chosen from the group that includes an image file, a video file, a text file, a spreadsheet, an audio file, and a file having one or more slides or other types of presentations.

5. The method of claim 1, wherein the first set of content objects includes at least one content object that is in the second set of content objects associated with the second of the plurality of profiles, and wherein the first set of content objects includes at least one content object that is not in the second set of content objects.

6. The method of claim 1, wherein the receiving an instruction further includes receiving an instruction to download one or more content objects included in the first set of content objects to the mobile device from a remotely located device.

7. The method of claim 1, further comprising:
   receiving an instruction corresponding to a requirement for a storage capacity in one or more memories of the mobile device;
   responsive to the received instruction corresponding to the requirement for a storage capacity, evaluating one or more devices in a prioritized group of devices for an ability to store one or more content objects; and
   causing the one or more content objects to be stored on the highest priority device of the group able to store the one or more content objects.

8. The method of claim 1, further comprising:
   presenting, on the mobile device, the content object of the second set as a candidate for removal from the mobile device; and
   receiving an indication at the mobile device that the content object of the second set is to be removed from the mobile device,
   wherein the removing of the content object of the second set from the mobile device is responsive to receiving the indication.

9. The method of claim 8, wherein the indication comprises at least one of:
   depression of a key or button on the mobile device, a verbal command, and expiration of a timer on the mobile device.

10. The method of claim 1, further comprising:
    referencing via at least one link, at the mobile device, a third set of content objects that are associated with the first profile responsive to activating the first profile.

11. An apparatus comprising:
    a processor; and
    memory storing instructions that, when executed by the processor, cause the apparatus to:
       receive an instruction to activate a first of a plurality of profiles for the apparatus, wherein each profile of the plurality is associated with a distinct set of user-defined content objects;
       activate the first profile in response to the received instruction, wherein said activation includes storing on the apparatus a first set of content objects associated with the first profile; and
       deactivate a second of the plurality of profiles in response to the received instruction, said deactivating including selecting a content object of a second set of content objects associated with the second profile and removing the content object of the second set from the apparatus based at least in part on a size and a frequency of use of the content object of the second set.

12. The apparatus of claim 11, wherein associations between the first profile and content objects in the first set and associations between the second of the plurality of profiles and content objects in the second set are stored at the apparatus.

13. The apparatus of claim 11, wherein associations between the first profile and content objects in the first set and associations between the second of the plurality of profiles and content objects in the second set are stored on a second apparatus.

14. The apparatus of claim 11, wherein the content objects include at least one object chosen from the group that includes an image file, a video file, a text file, a spreadsheet, an audio file, and a file having one or more slides or other types of presentations.

15. The apparatus of claim 11, wherein the first set of content objects includes at least one content object that is in the second set of content objects associated with the second of the plurality of profiles, and wherein the first set of content objects includes at least one content object that is not in the second set of content objects.

16. The apparatus of claim 11, wherein the receiving an instruction further includes receiving an instruction to download one or more content objects included in the first set of content objects to the apparatus from a remotely located device.

17. The apparatus of claim 11, wherein the processor is further configured to perform operations that include:
    receiving an instruction corresponding to a requirement for a storage capacity in one or more memories of the apparatus;
    responsive to the received instruction corresponding to the requirement for a storage capacity, evaluating one or more devices in a prioritized group of devices for an ability to store one or more content objects; and
    causing the one or more content objects to be stored on the highest priority device of the group able to store the one or more content objects.

18. The apparatus of claim 11, wherein the instructions, when executed by the processor, cause the apparatus to:

present the content object of the second set as a candidate for removal from the apparatus; and receive an indication at the apparatus that the content object of the second set is to be removed from the apparatus, wherein the removal of the content object of the second set from the apparatus is responsive to receiving the indication.

19. The apparatus of claim 11, wherein the instructions, when executed by the processor, cause the apparatus to:

reference via at least one link, at the apparatus, a third set of content objects that are associated with the first profile responsive to activating the first profile.

20. An apparatus comprising:

means for receiving an instruction to activate a first of a plurality of profiles for the apparatus, wherein each profile of the plurality is associated with a distinct set of user-defined content objects;

means for activating the first profile in response to the received instruction, wherein said activation includes storing on the apparatus a first set of content objects associated with the first profile; and means for deactivating a second of the plurality of profiles in response to the received instruction, said deactivating including selecting a content object of a second set of content objects associated with the second profile and removing the content object of the second set from the apparatus based at least in part on a size and a frequency of use of the content object of the second set.

* * * * *